US009129231B2

(12) United States Patent
Kaufman et al.

(10) Patent No.: US 9,129,231 B2
(45) Date of Patent: Sep. 8, 2015

(54) REAL TIME ENERGY CONSUMPTION ANALYSIS AND REPORTING

(75) Inventors: Philip John Kaufman, Milwaukee, WI (US); Marcia Elaine Walker, Durham, NC (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 160 days.

(21) Appl. No.: 12/429,813

(22) Filed: Apr. 24, 2009

(65) Prior Publication Data
US 2010/0274602 A1 Oct. 28, 2010

(51) Int. Cl.
G06F 17/00 (2006.01)
G06Q 10/04 (2012.01)
G06Q 10/06 (2012.01)

(52) U.S. Cl.
CPC ............... *G06Q 10/04* (2013.01); *G06Q 10/06* (2013.01); *G06Q 10/0639* (2013.01)

(58) Field of Classification Search
CPC . G06Q 10/06; G06Q 10/063; G06Q 10/0631; G06Q 10/06313; G06Q 10/0633; G06Q 10/06375; G06Q 10/0639
USPC ............... 705/1.1, 7.11, 7.37, 7.38, 400, 412, 705/413; 702/61
See application file for complete search history.

(56) References Cited

U.S. PATENT DOCUMENTS

| | | | |
|---|---|---|---|
| 4,039,392 A | 8/1977 | Singh | |
| 4,300,125 A | 11/1981 | Loshing et al. | |
| 4,341,345 A | 7/1982 | Hammer et al. | |
| 4,383,298 A | 5/1983 | Huff et al. | |
| 4,624,685 A | 11/1986 | Lueckenotte et al. | |
| 4,827,395 A | 5/1989 | Anders et al. | |
| 5,043,929 A | 8/1991 | Kramer et al. | |
| 5,202,996 A | 4/1993 | Sugino et al. | |
| 5,251,205 A | 10/1993 | Callon et al. | |
| 5,297,057 A | 3/1994 | Kramer et al. | |
| 5,646,862 A | 7/1997 | Jolliffe et al. | |
| 5,736,983 A | 4/1998 | Nakajima et al. | |
| 5,822,207 A | 10/1998 | Hazama et al. | |

(Continued)

FOREIGN PATENT DOCUMENTS

| | | |
|---|---|---|
| EP | 0977137 A2 | 2/2000 |
| WO | 2004074954 A2 | 9/2004 |
| WO | 2008011427 A2 | 1/2008 |

OTHER PUBLICATIONS

GE Energy. "Energy and Asset Performance—Fact Sheet." Sep. 2005. General Electric Company. Published online at [http://www.gepower.com/prod_serv/serv/industrial_service/en/downloads/gea14163_eap.pdf], retrieved Apr. 13, 2009. 2 pages.

(Continued)

*Primary Examiner* — Igor Borissov
(74) *Attorney, Agent, or Firm* — Fletcher Yoder, P.C.

(57) ABSTRACT

The claimed subject matter relates to an architecture that can facilitate analysis, processing, or reporting in connection with energy consumption data and/or emissions or sustainability factors associated with an automation process. In particular, the architecture can obtain process-level or machine- or device-level energy consumption data collected during execution of an automation process. The data can be analyzed or processed, with general or application-specific results output to a specified recipient and/or formatted (e.g., parsed, filtered, or transformed) according to a general or application-specific scheme.

20 Claims, 10 Drawing Sheets

(56) References Cited

U.S. PATENT DOCUMENTS

| | | |
|---|---|---|
| 5,924,486 A | 7/1999 | Ehlers et al. |
| 5,983,622 A | 11/1999 | Newburry et al. |
| 6,012,053 A | 1/2000 | Pant et al. |
| 6,015,783 A | 1/2000 | von der Osten et al. |
| 6,076,108 A | 6/2000 | Courts et al. |
| 6,263,255 B1 | 7/2001 | Tan et al. |
| 6,281,784 B1 | 8/2001 | Redgate et al. |
| 6,289,252 B1 | 9/2001 | Wilson et al. |
| 6,321,983 B1 | 11/2001 | Katayanagi et al. |
| 6,473,893 B1 | 10/2002 | Kay et al. |
| 6,507,774 B1 | 1/2003 | Reifman et al. |
| 6,633,823 B2 | 10/2003 | Bartone et al. |
| 6,701,298 B1 | 3/2004 | Jutsen |
| 6,732,055 B2 | 5/2004 | Bagepalli et al. |
| 6,747,368 B2 | 6/2004 | Jarrett, Jr. |
| 6,785,592 B1 | 8/2004 | Smith et al. |
| 6,857,020 B1 | 2/2005 | Chaar et al. |
| 6,859,755 B2 | 2/2005 | Eryurek et al. |
| 7,043,316 B2 | 5/2006 | Farchmin et al. |
| 7,274,975 B2 | 9/2007 | Miller |
| 7,277,864 B2 | 10/2007 | Ohnemus et al. |
| 7,409,303 B2 | 8/2008 | Yeo et al. |
| 7,451,019 B2 | 11/2008 | Rodgers |
| 7,477,956 B2 | 1/2009 | Huang et al. |
| 7,531,254 B2 | 5/2009 | Hibbs et al. |
| 7,565,351 B1 | 7/2009 | Callaghan |
| 7,587,251 B2 | 9/2009 | Hopsecger |
| 7,747,416 B2 | 6/2010 | Deininger et al. |
| 7,788,189 B2 | 8/2010 | Budike, Jr. |
| 8,068,938 B2 | 11/2011 | Fujita |
| 8,271,363 B2 | 9/2012 | Branscomb |
| 2001/0011368 A1 | 8/2001 | Graser et al. |
| 2002/0013744 A1 | 1/2002 | Tsunenari et al. |
| 2002/0026343 A1 | 2/2002 | Duenke |
| 2002/0066072 A1 | 5/2002 | Crevatin |
| 2002/0099464 A1 | 7/2002 | O'Connor et al. |
| 2002/0099804 A1 | 7/2002 | O'Connor et al. |
| 2002/0116239 A1 | 8/2002 | Reinsma et al. |
| 2002/0128933 A1 | 9/2002 | Day et al. |
| 2002/0168621 A1 | 11/2002 | Cook et al. |
| 2002/0169582 A1 | 11/2002 | Eryurek et al. |
| 2002/0178047 A1 | 11/2002 | Or et al. |
| 2002/0198755 A1 | 12/2002 | Birkner et al. |
| 2003/0014500 A1 | 1/2003 | Schleiss |
| 2003/0028527 A1 | 2/2003 | Crosby et al. |
| 2003/0061091 A1 | 3/2003 | Amaratunga et al. |
| 2003/0088370 A1 | 5/2003 | Bagepalli et al. |
| 2003/0110065 A1 | 6/2003 | Twigge-Molecey |
| 2003/0110369 A1 | 6/2003 | Fish et al. |
| 2003/0171851 A1 | 9/2003 | Brickfield et al. |
| 2003/0221119 A1 | 11/2003 | Geiger et al. |
| 2004/0088119 A1 | 5/2004 | Landgraf |
| 2004/0107345 A1 | 6/2004 | Brandt et al. |
| 2004/0117240 A1 | 6/2004 | Ness et al. |
| 2004/0143467 A1 | 7/2004 | McAllister et al. |
| 2004/0158506 A1 | 8/2004 | Wille |
| 2004/0199294 A1 | 10/2004 | Fairlie et al. |
| 2004/0205412 A1 | 10/2004 | Staron et al. |
| 2004/0249697 A1 | 12/2004 | Ohnemus et al. |
| 2004/0260489 A1 | 12/2004 | Mansingh et al. |
| 2004/0261673 A1 | 12/2004 | Allen et al. |
| 2005/0015287 A1 | 1/2005 | Beaver |
| 2005/0034023 A1 | 2/2005 | Maturana et al. |
| 2005/0065971 A1 | 3/2005 | Honda |
| 2005/0143865 A1 | 6/2005 | Gardner |
| 2005/0144154 A1* | 6/2005 | DeMesa et al. ............... 707/1 |
| 2005/0171910 A1 | 8/2005 | Wu et al. |
| 2005/0198241 A1 | 9/2005 | Pavlik et al. |
| 2005/0198333 A1 | 9/2005 | Dinges |
| 2005/0234904 A1 | 10/2005 | Brill et al. |
| 2005/0278296 A1 | 12/2005 | Bostwick |
| 2006/0026145 A1 | 2/2006 | Beringer et al. |
| 2006/0248002 A1 | 11/2006 | Summer et al. |
| 2007/0038646 A1 | 2/2007 | Thota |
| 2007/0073750 A1 | 3/2007 | Chand et al. |
| 2007/0078736 A1 | 4/2007 | Chand et al. |
| 2007/0168213 A1 | 7/2007 | Comrie |
| 2007/0226068 A1 | 9/2007 | Keil et al. |
| 2007/0283030 A1 | 12/2007 | Deininger et al. |
| 2008/0015975 A1 | 1/2008 | Ivchenko et al. |
| 2008/0046387 A1 | 2/2008 | Gopal et al. |
| 2008/0046407 A1 | 2/2008 | Shah et al. |
| 2008/0059457 A1 | 3/2008 | Ohnemus et al. |
| 2008/0079560 A1 | 4/2008 | Hall et al. |
| 2008/0127779 A1 | 6/2008 | Morales Cerda et al. |
| 2008/0154749 A1 | 6/2008 | D'hooghe et al. |
| 2008/0255889 A1 | 10/2008 | Geisler et al. |
| 2008/0255899 A1* | 10/2008 | McConnell et al. ............... 705/7 |
| 2008/0270272 A1 | 10/2008 | Branscomb |
| 2008/0272934 A1 | 11/2008 | Wang et al. |
| 2008/0319812 A1 | 12/2008 | Sousa et al. |
| 2009/0083843 A1 | 3/2009 | Wilkinson, Jr. et al. |
| 2009/0099887 A1 | 4/2009 | Sklar et al. |
| 2009/0100159 A1 | 4/2009 | Extra |
| 2009/0132176 A1* | 5/2009 | McConnell et al. ............. 702/23 |
| 2009/0138415 A1 | 5/2009 | Lancaster |
| 2009/0177505 A1* | 7/2009 | Dietrich et al. ................... 705/7 |
| 2009/0222307 A1 | 9/2009 | Beaver |
| 2009/0281674 A1 | 11/2009 | Taft |
| 2009/0281677 A1 | 11/2009 | Botich et al. |
| 2009/0313164 A1 | 12/2009 | Hoglund |
| 2009/0319315 A1 | 12/2009 | Branscomb |
| 2010/0023360 A1 | 1/2010 | Nadhan |
| 2010/0030601 A1 | 2/2010 | Warther et al. |
| 2010/0042455 A1 | 2/2010 | Liu et al. |
| 2010/0057480 A1 | 3/2010 | Arfin et al. |
| 2010/0088136 A1* | 4/2010 | Cheng et al. ...................... 705/8 |
| 2010/0100405 A1 | 4/2010 | Lepore et al. |
| 2010/0131343 A1 | 5/2010 | Hamilton |
| 2010/0138003 A1 | 6/2010 | August et al. |
| 2010/0217642 A1 | 8/2010 | Crabtree et al. |
| 2010/0217651 A1 | 8/2010 | Crabtree et al. |
| 2010/0218108 A1 | 8/2010 | Crabtree et al. |
| 2010/0249975 A1 | 9/2010 | Rezayat |
| 2010/0262445 A1 | 10/2010 | DeSorbo |
| 2010/0274367 A1 | 10/2010 | Kaufman et al. |
| 2010/0274377 A1 | 10/2010 | Kaufman et al. |
| 2010/0274603 A1 | 10/2010 | Walker et al. |
| 2010/0274611 A1 | 10/2010 | Kaufman et al. |
| 2010/0274612 A1 | 10/2010 | Walker et al. |
| 2010/0274629 A1 | 10/2010 | Walker et al. |
| 2010/0274810 A1 | 10/2010 | Walker et al. |
| 2010/0275147 A1 | 10/2010 | Kaufman et al. |
| 2010/0292856 A1 | 11/2010 | Fujita |
| 2010/0314940 A1 | 12/2010 | Palmer et al. |
| 2010/0318233 A1 | 12/2010 | Yunes et al. |
| 2010/0332373 A1 | 12/2010 | Crabtree et al. |
| 2011/0046800 A1 | 2/2011 | Imes et al. |
| 2011/0071721 A1 | 3/2011 | Gilfillan et al. |
| 2011/0172838 A1 | 7/2011 | Pai et al. |
| 2011/0273022 A1 | 11/2011 | Dennis et al. |

OTHER PUBLICATIONS

ABB. "Energy Management Solution for the Process Industry—Energy Management and Optimization." Apr. 6, 2007. Published online at [http://library.abb.com/global/scot/scot313.nsf/veritydisplay/5e48efb88a7e1cbac125734600737b02/$File/3BFI405000R4001_en_Energy_Management_and_Optimization_3.5.pdf], retrieved Apr. 13, 2009. 12 pages.

ABB. "Energy Management and Optimization for the Process Industries—Advanced IT Tools for Planning, Monitoring, Controlling, and Reporting Energy System Operations." Published online at [http://library.abb.com/global/scot/scot296.nsf/veritydisplay/bd2a898a24267c46c12571c70070a851/$File/3BFI402000R3001_en_Advanced_IT_Tools_for_Energy_Management.pdf], retrieved Apr. 13, 2009. 6 pages.

Dietmair A, et al., "Energy Consumption Modeling and Optimization for Production Machines". Sustainable energy technologies, 2008. ICSET 2008. IEEE International Conference on IEEE, Piscataway, NJ, USA, Nov. 24, 2008, pp. 574-579, XP031442235, ISBN: 978-1-4244-1887-9.

(56) References Cited

OTHER PUBLICATIONS

European Search Report for European Patent Application No. 10160649.9-1238 dated Sep. 23, 2010, 8 pages.
European Search Report for European Patent Application No. 10160581.4-1238 dated Sep. 23, 2010, 8 pages.
European Search Report for European Patent Application No. 10160673.9-1238 dated Sep. 23, 2010, 9 pages.
Kiritsis D, et al., Research issues on product lifecycle management and information tracking using smart embedded systems. Advanced Engineering Informatics, Elsevier Lnkd—DOI : 10.1016/J.AEI2004.09.005, vol. 17, no. 3-4, 1 Jul. 2003, pp. 189-202, XP004595481 ISSN: 1474-0346.
Y-S Ma, et al., Product Lifecycle Analysis and Optimization in an Eco-value Based, Sustainable and Unified Approach. Industrial Informatics, 2006 IEEE International Conference on, IEEE, PI, Aug. 1, 2006, pp. 537-541 XP031003409, ISBN: 978-0-7803-9700-2.
Seref Erkayhan Ed-Ding Zhen-Hua et al., The Use of RFID enables a holistic Information Management within Product Lifecycle Management (PLM). RFID EURASIA, 2007 1st Annual, IEEE, PI Sep. 1, 2007, pp. 1-4, XP031153342. ISBN: 978-975-1-5660-1.
European Search Report for European Patent Application No. 10160811.5 dated Sep. 20, 2010, 9 pages.
European Search Report dated Nov. 4, 2010 for European Patent Application No. EP 10 16 0737, 9 pages.
European Search Report completed Aug. 6, 2010 for European Patent Application No. EP 10 16 0810, 2 pages.
EPO : Notice from the European patent Office dated Oct. 1, 2007 concerning business methods. Official Journal of the European Patent Office, vol. 30, No. 11, Nov. 1, 2007, pp. 592-593.
European Search Report for European Application No. 10160585.5-1527 / 2254061 dated Dec. 20, 2010, 9 pages.
Kouloura, et al., "A Systems Approach to Corporate Sustainability in Energy Management of Industrial Units", IEEE Systems Journal, vol. 2, No. 4, Dec. 2008, pp. 442-452.
Yang, et al., "Eco-Design for Product Lifecycle Sustainability", IEEE International Conference on Industrial Informatics, 2006, pp. 548-553.
U.S. Appl. No. 13/275,983, filed Oct. 18, 2011, David D. Brandt.
Pat Kennedy et al.; "In Pursuit of the Perfect Plant, a Business and Technical Guide"; Apr. 2008; Chapter 9—Energy Management; pp. 251-283; published by Evolved Technologist Press, New York, New York—U.S.A.
Jawahir, I. S., et al. "Total life-cycle considerations in product design for sustainability: A framework for coomprehensive evaluation." Proc. 10th Int. Research/Expert Conf. (TMT 2006), Barcelona, Spain, 2006.
A.D. Jayal, F. Badurdeen, O.W. Dillon Jr., I.S. Jawahir, Sustainable manufacturing: Modeling and optimization challenges at the product, process and system levels, CIRP Journal of Manufacturing Science and Technology, vol. 2, Issue 3, 2010, pp. 144-152, ISSN 1755-5817.
Dillenburg, Stephen, Timothy Greene, and O. Homer Erekson. "Aproaching socially responsible investment with a comprehensive ratings scheme: total social impact." Journal of Business Ethics 43.3 (2003): 167-177.

\* cited by examiner

| EXAMPLE BILL OF MATERIALS ||||||
|---|---|---|---|---|---|
| PART NO. | ELEC. USAGE (KW-H) | PEAK DEMAND ($) | CARBON DIOXIDE (KG) | ... | OTHER SUSTAIN. FACTORS |
| XY123 | 21 | 198.45 | 308.7 | ... | PASSED |
| XA124 | 37 | 349.65 | 543.9 | ... | 51.7 |
| YY125 | 15 | 141.75 | 220.5 | ... | CERT. |
| AB126 | 150 | 1417.50 | 2205 | ... | YES |

FIG. 3

REAL TIME ENERGY CONSUMPTION ANALYSIS AND REPORTING

TECHNICAL FIELD

The claimed subject matter relates generally to industrial control systems and more particularly to analysis or reporting of process-level or device-level energy consumption or sustainability data.

BACKGROUND

The impact of environmental changes, current economic climate, and governmental pressures to reduce energy demands and greenhouse gas emission will force manufacturers to explore energy reductions on the plant floor. Generally, industrial energy consumption is impacted by two major variables—environmental changes and production output. Environmental changes (e.g., air temperature, humidity, time of day, and so forth) on facilities' energy consumption can be measured, trended, and controlled through energy tracking software and building automation systems. Production output's impact on energy consumption is generally estimated and not measured.

Currently, there are no direct incentives on the plant floor to reduce energy consumption since energy consumption is not measured against production volumes. Rather, energy costs are fixed allocations (generally, cost estimated at per month per square foot). Advances in automation can allow manufactures to make better production decisions based on energy availability, real time pricing, and emission caps but it does not go far enough. Moreover, various products and solutions provide energy and emission management from the facility or macro infrastructure (e.g., substations, switchgears, emission monitors). These tools apply production related information against the overall facility energy data to infer energy performance. Others focus energy and emission management on a building management level e.g., Data Centers, lighting, chiller and boilers.

To deal with current and future energy demand management issues, much more data relating to energy will need to become available. However, energy monitoring today is done at the facility level. Understanding energy usage patterns is accomplished by reviewing the logged data for obvious discrepancies or trends in consumption. The current demand management systems are nothing more than infrastructure max capacity load shedding applications. Newer systems may include the ability to transfer to on-site generation with auxiliary diesel or natural gas generators. Unfortunately, a general lack of energy information from production and utilities makes true demand management decisions impossible in today's environment.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

An industrial control architecture is provided that can facilitate real time analysis or reporting in connection with energy consumption data, water consumption, other resource consumption or utilization, and/or other sustainability factors associated with an automation process. In one aspect, the architecture can obtain energy consumption data generated upon initiation of, during execution of, or upon completion of an automation process employed by an industrial control configuration to produce a specified product, service, or output. The energy consumption data can be generated or collected in discrete quantities and across various portions of a factory during execution of the automation process by an industrial control configuration, and can thus be substantially real-time information.

In addition, the architecture can examine the obtained energy consumption data, water usage data, or other resource or sustainability factor, and can further output processed data (e.g., energy consumption data that is transformed or otherwise processed to a degree) that pertains to an operational parameter of the automation process. The operational parameter can be, e.g., a run-time parameter, a process scheduling parameter, a production modulation parameter or the like. Moreover, the architecture can also generate a process statement associated with the energy consumption data or the processed data. The process statement can relate to application-specific formatting or selection of the energy consumption data or the processed data.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

BRIEF DESCRIPTION OF THE DRAWINGS

FIG. 3 provides block diagram of a graphical depiction of an example bill of materials associated with a product or other result of an automation process.

DETAILED DESCRIPTION

Figure 1:
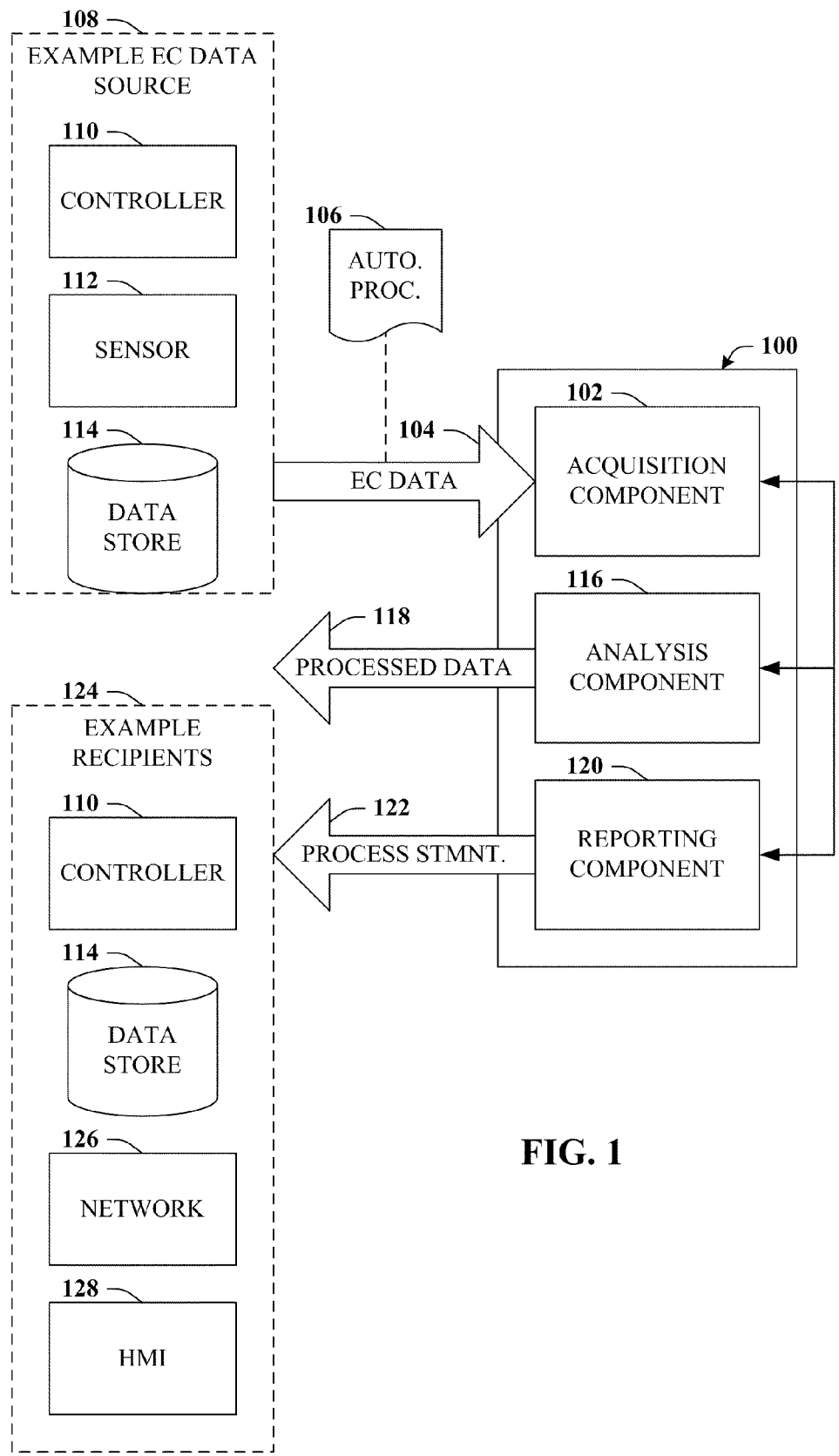
FIG. 1 illustrates a block diagram of a computer-implemented system that can facilitate analysis or reporting in connection with energy consumption data and/or other sustainability factors associated with an automation process.

Systems and a method are provided for acquiring, analyzing, and reporting process-level or machine-level energy consumption data or other suitable data relating to sustainability factors in connection with an automation process. For example, energy consumption data can be reported as or included in an alert, a key performance indicator (KPI), an executive summary, a bill of materials, or as a parameter input to other components such as those directed to further analysis or optimization. The reported data (e.g., a process statement) can be formatted according to the type of data, based upon the specific application, or based upon the recipient or request parameters. In particular, the process statement can be delivered to an authorized agent such as a plant manager or a decision processor or other intelligence-based components that can employ the data contained therein to determine suitable action. Moreover, the process statement can be delivered by way of an email or another electronic message or output to an interface in response to a query or other interaction. Furthermore, information included in the process statement can be substantially real-time and can thus include or reference current environmental factors for subsequent decision-making such as, e.g., for optimization of the automation process.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can facilitate analysis or reporting in connection with energy consumption data and/or other sustainability factors associated with an automation process is depicted. Such analysis or reporting can be employed for optimization of the automation process according to a variety of factors, schemes, or goals heretofore unknown or infeasible, which is discussed further infra in connection with FIGS. 4 and 5. Generally, system 100 can include acquisition component 102 that can obtain energy consumption data 104 generated during execution of automation process 106 employed by an industrial control configuration, e.g., in order to produce a specified product, service or other output. Reference numeral 108 depicts non-exhaustive example sources of such energy consumption data 104. In particular, acquisition component 102 can obtain energy consumption data 104 from one or more controllers 110 or one or more sensors 112, any or all of which can be included in or operatively coupled to the industrial control configuration or a machine, device, or component thereof. Likewise, acquisition component 102 can obtain energy consumption data 104 from data store 114, which can be continuously updated by, e.g., controller 110 or sensor 112. Regardless of the actual source 108, it should be appreciated that energy consumption data 104 can be substantially real-time information collected or aggregated during the execution of, or upon completion of, automation process 106. Additional discussion with respect to the industrial control configuration can be found in connection with FIG. 2, which can now be referenced to provide additional context before continuing the discussion of FIG. 1.

Figure 2:
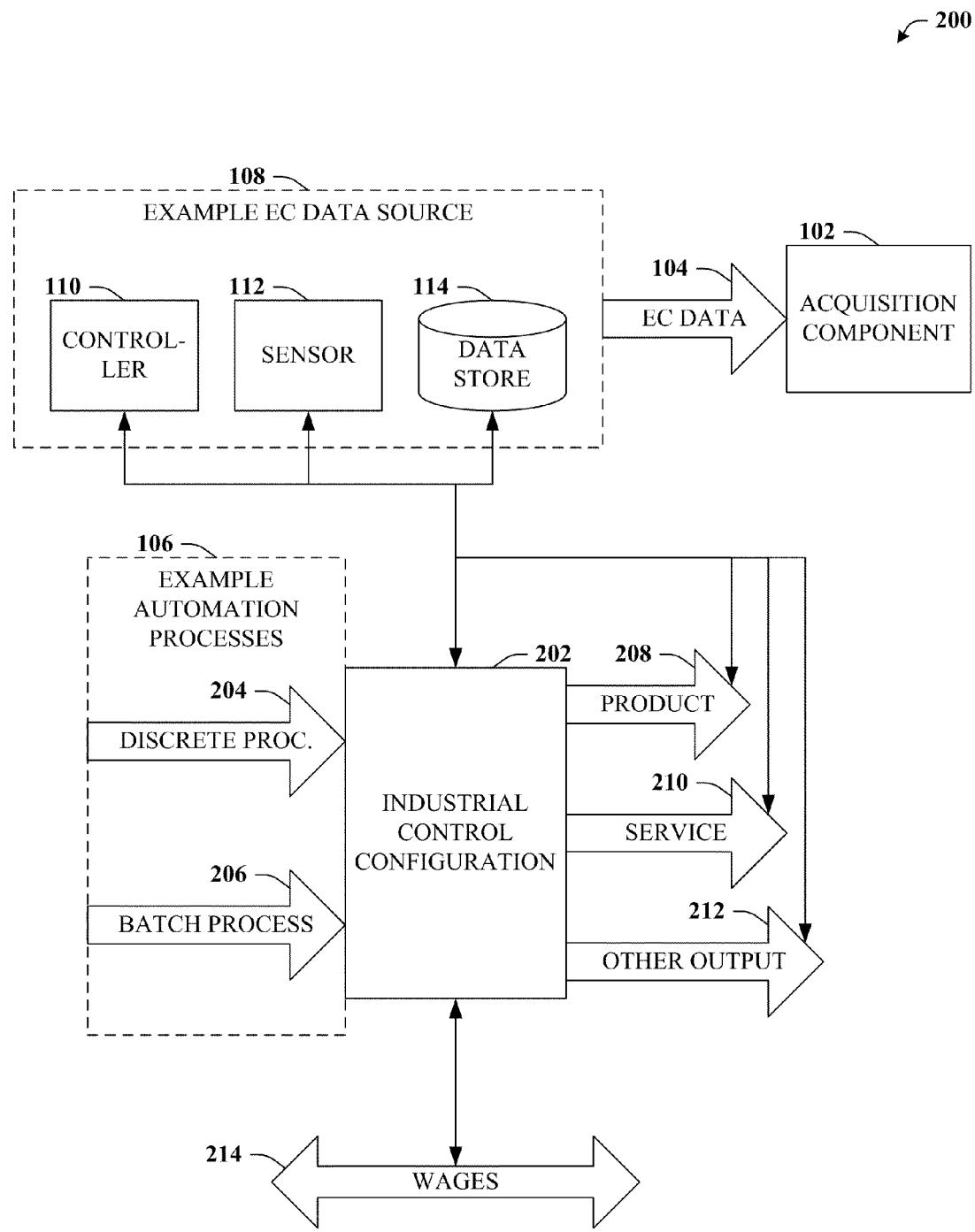
FIG. 2 depicts a block diagram of a system that illustrates additional aspects, features, or context associated with the automation process or the industrial control configuration.

While still referring to FIG. 1, but turning concurrently to FIG. 2, system 200 illustrates additional aspects, features, or context associated with the automation process or the industrial control configuration. As noted supra, acquisition component 102 can obtain energy consumption data 104 generated during execution of automation process 106 and/or such data 104 collected or aggregated thereafter. It should be appreciated that energy consumption data 104, as well as other references to energy consumption discussed herein, whether in the description or the appended claims, is intended to relate to energy consumption, yet as used herein unless specified to the contrary or otherwise inapplicable, energy consumption can also relate to water consumption or other resource consumption in connection with automation process 106 as well as to other suitable sustainability factors. It should be further called out that while water (or another suitable resource) is commonly tracked in accordance with recipes; additional water, beyond what is called for in the recipe, is often utilized. Moreover, this additional water usage often is not sufficiently tracked by previous systems. For instance, a recipe for a bottle of cola might call for 2 liters of water, yet 3 liters might ultimately be used for rinsing or cleaning applications with respect to the bottle or the like. Thus, energy consumption data 104, when applicable to water usage is intended to include not only that which is expressed in an associated recipe, but also water (or other sustainability factors) used elsewhere.

It should also be appreciated that automation process 106 can be applied to or implemented by industrial control configuration 202, which is intended to represent a set of machines, devices, or components, either hardware or software that are configured to execute automation process 106. The automation process 106 can be or include one or more discrete processes 204 (e.g., assembly-line production of an automobile or a luggage conveyor belt at an airport) or one or more batch processes 206 (e.g., production of beer or fragrances). It should be further appreciated that industrial control configuration 202, upon execution of automation process 106, can yield various types of desired output such as product 208 (e.g., a finished good such as an automobile or consumable), service 210 (e.g., transportation, heat, or the like provided by way of a transit/conveyor or furnace), or other output 212 (e.g., work-in-process, by-products, data, or the like).

Regardless of the actual composition of, or the particular application of, industrial control configuration 202 and/or the particular automation process 106 executed, industrial control configuration 202 can employ various power sources, coolants, certain raw materials, and/or catalysts, which are denoted as WAGES 214. WAGES 214 is intended to specifically relate to water, air, gases, electricity, or steam, however, more generally, WAGES 214 can represent essentially electricity as well as any matter or material propagated by way of a pipe or tube, but can be substantially any suitable material of phenomena as well. Moreover, use or consumption of WAGES 214 by industrial control configuration 202 can be monitored by controller 110 or sensor 112 in order to generate energy consumption data 104, which can then be provided to data store 114 or obtained directly by acquisition component 102 as discussed in connection with FIG. 1. Furthermore, controller 110 or sensor 112 can also monitor features associated with product 208, service 210, or other output 212, e.g., to obtain information associated not only with energy consumption but also with emissions or other sustainability factors, which is discussed in more detail with reference to FIGS. 3 and 4. Such information can be included with energy consumption data 104 and can also be obtained by acquisition component 102. Moreover, it should be underscored that energy consumption data 104 can relate to WAGES 214 usage (or emissions or sustainability factors) in connection with a single, particular automation process 106 or sub-process thereof, whereas previous energy-based solutions or packages are directed to a plant or facility as a whole and thus lack the requisite granularity to provide many of the features detailed herein.

Continuing the description of FIG. 1, system 100 can further include analysis component 116 that can examine energy consumption data 104 and that can further output processed data 118 based upon the examination of energy consumption data 106. Processed data 118 can pertain to an operational parameter of automation process 106, and can be substantially similar to and/or related to or based upon raw energy consumption data 104, yet processed in a suitable manner such as parsed, aggregated, transformed, formatted, or the like. Moreover, given the wide application of potential uses, analysis component 116 can further select relevant portions of energy consumption data 104 applicable to a particular application, with the selected result described herein as processed data 118.

In more detail, in one or more aspects of the claimed subject matter, the operational parameter can be a run-time parameter (e.g., a temperature, a speed, a duration, a raw material . . . ) that relates to configuration of a device, machine, or component of industrial control configuration 202 employed in connection with automation process 106. Likewise, in one or more aspects, the operational parameter can be a process scheduling parameter that establishes a timetable for engagement of a device, machine, or component of industrial control configuration 202 employed in connection with automation process 106. As still another example, the operational parameter can be a production modulation parameter (e.g., a desired output or quantity thereof, a desired quality or feature . . . ) that can relate to modification of automation process 106 or a predetermined schedule thereof. The operational parameter can be combinations of the above-mentioned examples or other suitable parameters.

Furthermore, system 100 can also include reporting component 120 that can generate process statement 122 associated with energy consumption data 106 and/or processed data 118. Process statement 122 is intended to abstractly represent substantially any data output associated with or determined or inferred by analysis component 116 (or other components described herein such as optimization component 402 discussed in connection with FIG. 4). Accordingly, process statement 122 can include all or portions of processed data 118 as well as energy consumption data 104. Hence, process statement 122 can be generated according to a variety of different purposes or goals. For example, process statement 122 can be either or both informational (e.g., an alert, notification, or report) or operational (e.g., a command or instruction).

In one or more aspects of the claimed subject matter, process statement 122 can be or constitute portions of a bill of materials that can include a column for energy consumption in connection with automation process 106. More particularly, such a bill of materials can itemize energy consumption data 104 associated with production of all or a portion of the specified product (e.g., product 208), service (e.g., service 210), or output (e.g., other output 212). FIG. 3, which can now be briefly referenced before continuing the discussion of FIG. 1, provides graphical depiction 300 of an example bill of materials associated with a result (e.g., product 208) of an automation process. In the provided illustration, bill of materials 302 includes a part number column 304 that can list the component parts (or component processes) necessary to fabricate or provide the result. While previous bills of materials commonly list items such as the raw materials, sub-components, process times, and quantities needed to manufacture a product, no previous bill of material has included a breakdown of energy consumption in connection with the manufacture of the product. Indeed, prior systems or their providers have yet to contemplate and/or implement the potential current and future uses such information can facilitate, whether as a bill of material or in connection with other aspects of process statement 122.

However, unlike traditional bills of materials, bill of materials 302 can include the aforementioned energy consumption aspects, which is depicted by column 306. Data employed to populate respective rows of column 306 can be obtained from energy consumption data 104. Continuing, column 308 can relate to the price of the associated energy usage from column 306 based upon the peak demand calculation typically associated with utility companies. Values associated with column 308 can be included in processed data 118 and can be determined or derived by, e.g., looking up the suitable price value for the peak demand price structure and multiplying that value by the amount listed in column 306. Accordingly, consumers of bill of materials 302 can immediately identify the price in terms of energy costs for any given output of automation process 106 or a component thereof apart from or in addition to the cost of materials and/or labor prominent in conventional bills of materials.

Similarly, bill of materials 302 can also include information associated with emissions as illustrated by the example of carbon dioxide depicted at column 310. Values for each row of column 310 can be supplied either as a function of the associated row of column 306 (e.g., applying a known value to carbon dioxide emitted by a utility provider in the production of the consumed amount of kW-h of electricity) or by way of direct monitoring of various emissions during automation process 106, e.g., by sensor 112. It should be appreciated that carbon dioxide is merely one example and other types of emissions (e.g., nitrogen oxide, sulfur dioxide . . . )

can be provided on bill of materials 302. In addition, as depicted by column 312, bill of materials 302 can also include various other sustainability factors. As used herein, "sustainability factors" are intended to broadly relate to energy consumption or water consumption, and can include, e.g., energy, water, emissions, an energy source or provider, an energy type, raw materials, carbon footprint of materials, waste, effluent, worker safety, corporate policy labor policy, regulatory mandates, or the like. Both emissions and other sustainability factors are detailed further in connection with FIG. 4. Moreover, it should be appreciated that values for emissions or other sustainability factors (e.g., columns 310, 312, etc.) can be obtained directly from energy consumption data 104 or processed and/or retrieved by analysis component 116 as processed data 118.

Referring back to FIG. 1, the scope and merits of the claimed subject matter should be more readily apparent. For example, businesses throughout the globe are increasingly pressured by the governments of many nations to reduce energy demands and greenhouse gas emission. Such governmental pressures will likely force manufacturers to explore energy reductions on the plant floor. Today, the two factors that impact industrial energy consumption most are (1) production output and (2) environmental changes. Environmental changes (e.g., air temperature, humidity, time of day) on a facility's energy consumption can be measured, trended, and controlled through energy tracking products or building automation systems in accordance with the notions detailed herein. Historically, the energy consumption impact of changes to production output has generally been estimated only. However, in connection with the claimed subject matter, the impact of production output to energy consumption can be precisely measured, which can lead to numerous opportunities in terms of efficiency and conservation.

For instance, previously there were no direct incentives on a plant floor to reduce energy consumption largely because energy consumption was not measured against production volumes. Rather, energy costs are generally fixed allocations, commonly priced per month per square foot. For example, if a plant manager desired to output 15 more units a month from existing equipment, he or she would not know the extra energy costs until a bill is received at the end of the month. On the other hand, production has historically been directly tied to accounting measures of profit, such that there is an implicit understanding, if not a widespread belief, that increasing production will always lead to higher profits. However, due to increasing energy costs, punitive pricing for intensive energy use, as well as current and future regulatory mandates, this belief may not always be subscribed to.

In fact, as energy prices rise, manufacturers of all stripes will need to account for energy consumption in many scheduling decisions of which they do not do today. Currently, inefficient scheduling choices are costing individual producers tens, if not hundreds, of thousands of dollars per year in demand penalties and tariffs, even if these producers are not aware of this fact. As a result of common peak demand pricing schemes adhered to by utility companies, some penalties can stay in place for upwards of 12 months due to temporary actions taken on a single day.

Most existing energy or emission management solutions or products approach this domain in a top-down manner, examining issues in terms of facility infrastructure (e.g., substations, switchgears, emission monitors). These solutions apply production related information against the overall facility energy data to infer energy performance. Other solutions focus energy and emission management on a building management level, for instance on data centers, lighting, chiller and boilers. None of these existing approaches can provide the versatility, power, and efficiency offered in connection with the claimed subject matter, which can relate to, inter alia, 1) acquisition of energy consumption data 104 extracted from the plant floor at the device or process level and correlation of that data to production output; 2) application of production modeling tools for production energy, emission, and/or sustainability factor forecasting and optimization; and/or 3) extension of the existing facility demand management system to include production. Moreover, portals to existing systems or infrastructure and regulatory mandates (e.g., Cap and Trade) can be provided for.

In accordance with the claimed subject matter, energy monitoring on the production floor can be tied to energy tracking solutions described herein, which can correlate production output to the energy consumed. For instance, energy can be metered and the empirical results can be added to the production bill of materials 302 as discussed above, or employed in another way as will be described below. Moreover, use of production simulation and forecasting tools, as well as, lean six sigma tools to optimize production against additional variables such as energy, rate schedules, emissions, or other sustainability factors can be provided as is further discussed with reference to FIG. 4.

Furthermore, the features detailed herein have a further benefit in that in many cases integration with existing infrastructure can be accomplished with very little expense to manufacturers, both in terms of hardware and software. For example, most automated production lines monitor some level of energy usage for startup profiles, maintaining recipe optimization, or for regulatory compliance. Unfortunately, conventional systems typically discard this data. Manufacturers therefore, e.g., by applying simple monitoring techniques or minimal hardware or software, can have the ability to make scheduling, forecasting, or optimizing choices against energy demands through the use of standard production simulation tools. These manufacturers can manipulate schedules to move orders that consume large amounts of energy to off peak pricing (load leveling). Also, in areas where energy has been de-regulated, manufactures will be able to make wiser choices based on manufacturing schedules. In terms of reporting or software, existing applications largely need only change units of measure. For example, columns or categories can be readily modified such that hours or minutes listed in conventional bills of materials or for executive summaries, key performance indicators (KPI) and so on can be replaced (or appended) with kilowatt-hours or the like, which can be effectuated by reporting component 120, e.g., and output as process statement 122.

As discussed previously, process statement 122 can be generated according to a variety of different purposes or goals, e.g. to be instructional or informative. Accordingly, reporting component 120 can format process statement 122 for a variety of different applications, and can further output process statement 122 to a variety of different recipients, a few examples of which are described by reference numeral 124. For instance, controller 110 included in or coupled to industrial control configuration 202 can be the recipient of information or an instruction based upon the original energy consumption data 104. Such information or instruction or other contents of process statement 122 can also be provided to data store 114 for later access or recall. Likewise, all or portions of process statement 122 can be propagated over network 126 such as a local area network (LAN) or a wide area network (WAN) or both; or output to an interface such as human-machine interface (HMI) 128. Thus, reporting component 120 can be configured to format and output process statement 122 by way of, e.g., email, electronic message, printer, or to a display or application. For example, process statement can be transmitted to an authorized network address (e.g., an alert by way of email or short message service (SMS) to an account or device of a plant manager), to a graphical display associated with HMI 128 (e.g., real-time display of energy consumption), or to a decision tree or controller (further detailed with reference to FIG. 5), or optimization components or modules in order to, e.g., facilitate energy-based intelligence with respect to automation process 106 or other aspects of industrial control configuration 202, which is further described in connection with FIG. 4

It is noted that components associated with the system 100 can include various computer or network components such as servers, clients, controllers, industrial controllers, programmable logic controllers (PLCs), batch controllers or servers, distributed control systems (DCS), communications modules, mobile computers, wireless components, control components and so forth that are capable of interacting across a network. Similarly, the term controller or PLC as used herein can include functionality that can be shared across multiple components, systems, or networks. For example, one or more controllers can communicate and cooperate with various network devices across the network. This can include substantially any type of control, communications module, computer, I/O device, sensors, Human Machine Interface (HMI) that communicate via the network that includes control, automation, or public networks. The controller can also communicate to and control various other devices such as Input/Output modules including Analog, Digital, Programmed/Intelligent I/O modules, other programmable controllers, communications modules, sensors, output devices, and the like.

The network can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware or software components). These include components such as switches with virtual local area network (VLAN) capability, LANs, WANs, proxies, gateways, routers, firewalls, virtual private network (VPN) devices, servers, clients, computers, configuration tools, monitoring tools, or other devices.

Figure 4:
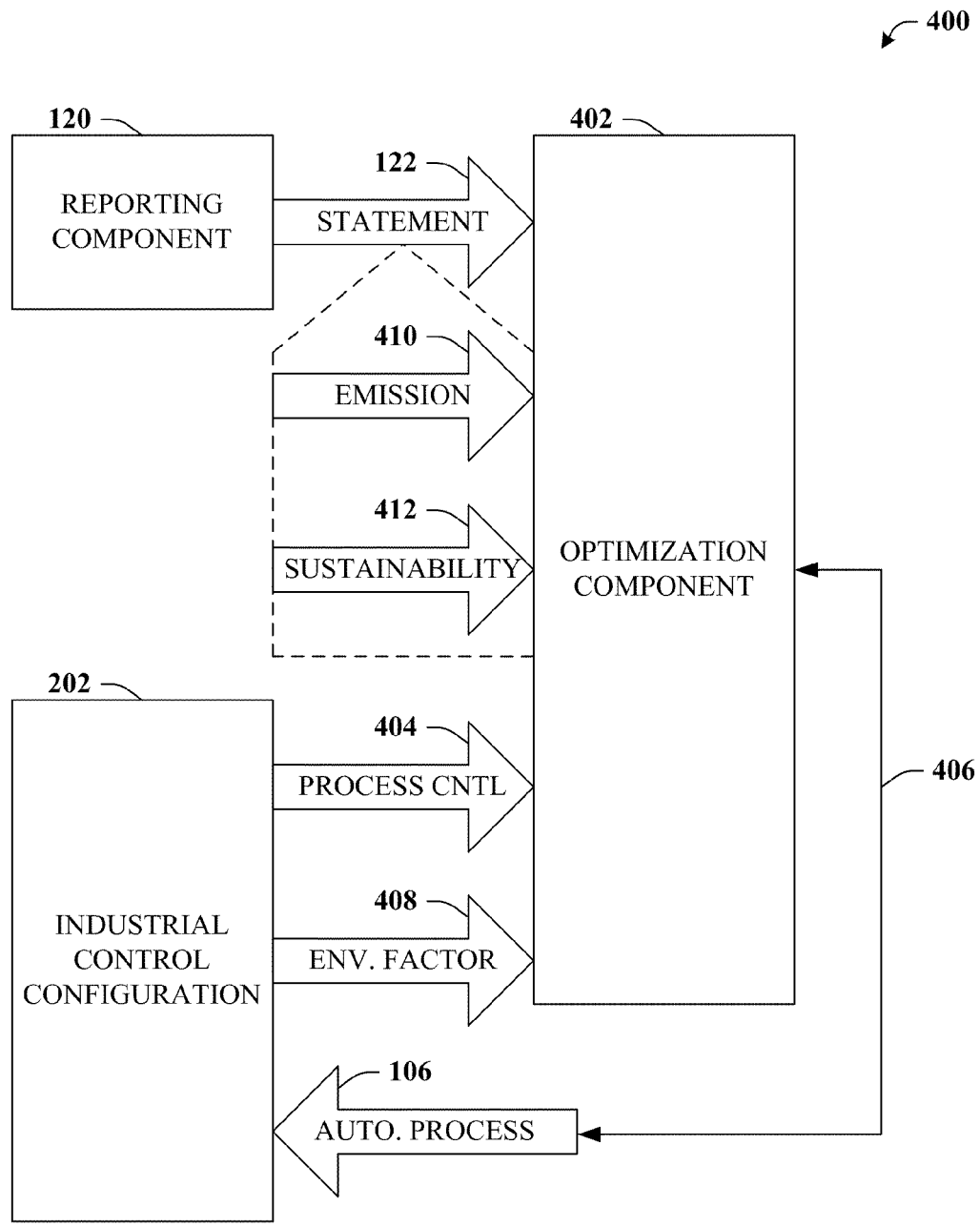
FIG. 4 is a block diagram of a system that can dynamically update automation processes based upon energy consumption, process control and/or environmental factors.

With reference to FIG. 4, system 400 that can dynamically update automation processes based upon energy consumption, process control and/or environmental factors is depicted. Generally, system 400 can include optimization component 402 that can also be a recipient of statement 122 delivered by reporting component 120. Optimization component 402 can employ the operational parameter (e.g., measured by analysis component 116 in connection with production of processed data 118) and process control algorithm 404 in order to determine update 406 to automation process 106. Update 406 can be based upon a state of energy consumption data 104, which, along with processed data 118 can be included in statement 122. In other words, based upon current energy consumption data 104, or based upon emission data 410 or sustainability factors 412, optimization component 402 can adjust automation process 106 to facilitate, e.g., increased efficiency, conservation, reduced costs, waste management, and so on. In one or more aspects of the claimed subject matter, update 406 can be further based upon air temperature, humidity, weather, time or date or other environmental factors 408. Process control algorithm 404 and environmental factor 408 can, as depicted, be transmitted by a component of industrial control configuration 202, but such need not necessarily be the case as other sources of such data can be available.

As one example, update 406 can relate to production demand management or production modulation. For instance, a typical electrical utility bill has a component for consumption, kilowatt-hours, and demand, average power over a pre-defined interval. The consumption charge is computed by multiplying the consumption amount by the applicable rate per kW-H. This rate can be constant or it can change based on the time of day, day of week, season, or current rate available in a de-regulated market. A user (e.g., a manufacturing facility) of the utility can achieve consumption cost saving by improving the facility system efficiency or by shifting usage into a time period with a lower rate per kW-H. Demand charge calculation methods vary from utility to utility, but almost all are based on measuring the average power over an interval, typically 15 or 30 minutes. In some instances the utility provides a signal to indicate the start or end of a discrete interval, and in some instances this interval is a continuously rolling window. The maximum recorded demand is then used to set the demand charge. The charge may apply only for the month in which it was incurred, or it could apply for considerably longer, perhaps the next 12 months.

Accordingly, controlling demand charges is a more complicated process. Such attempts at control can involve setting a peak demand limit that the user desires to stay below. The actual demand must then be continuously measured in real-time. The measured demand can be used to project what the average power will be at the end of the time interval. If the projected demand equals or exceeds the user-defined peak demand limit, action is required. This action can be as simple as manually turning off one or more loads until the next interval begins, or it can involve an automatic process. An automatic process is usually preferred since manual intervention can sometimes be delayed or unavailable. The automatic process usually involves identifying various loads that can be shut down for a short time and prioritizing them. The automated system can then shed loads starting with the lowest priority load until the projected demand is below the limit. Once a new interval begins, the automated system can re-apply the loads, typically in reverse order, to allow normal system operation. In an industrial facility the production equipment is usually not considered a shed-able load since this would disrupt the manufacturing process. Rather, more often, selected loads involve thermal storage such as HVAC or refrigeration, energy storage such as air compressors, or lighting loads.

The above strategy can successfully reduce the facility's electric bill, but additional aspects can further improve efficiency. For example, the above approach inherently assumes that the supply of electricity is unlimited up to the capacity of the connected electrical distribution equipment and it does not necessarily aid in optimizing the cost per unit for the products being produced. To improve this technique, additional metering of the system is required, such as that detailed supra. This additional metering must provide enough granularity for the facility to measure the energy used by various elements within a particular automation process 106 or facility system under a variety of operating conditions. With this information and the applicable utility rate structure and tax information, the facility can now construct a more complete breakdown of the true cost per unit for the output of the facility. Accordingly, it is now possible to construct a mathematical model that includes cost of raw materials, amortization of capital equipment, floor space, labor, prioritized production requirements, as well as energy, emissions or other sustainability factors. The output of the model (e.g., process statement 122) can facilitate control choices to be made that manage output requirements and energy usage while also optimizing the economic return to the company or a particular facility.

The availability of the energy requirement profile for various components of the facility or a manufacturing line or process thereof can also enable an enhancement to an associated automation process 106. For instance, as stated above, the typical method for controlling energy costs is simply turning on or off various portions of a facility. However, in many cases there is another alternative that may be more desirable. Instead of viewing the controllable elements as being either on or off, they can be controlled to operate along the continuum between those two states. In other words, the production line or process can be modulated based on the mathematical model. A simple example is now provided in order to illustrate this concept. Consider a facility that produces a product (e.g., product 208) that must be heated in an oven for a specific amount of time in order to cure or cook. In previous systems, when the cost or availability of energy was not a significant concern and generally not even known to the specified granularity, the system would be designed to produce the most finished product possible in the least amount of time while maintaining acceptable quality. This usually provided the best return for the cost expended, or at least insofar as the accounting, with no direct classification of energy costs, was concerned. In the current higher energy cost environment this might no longer be true. Rather, in many cases, it may now be a better economic decision to reduce the temperature in the oven and increase the time when the cost of energy is higher. Such modulation of the system might produce fewer products per unit of time. However, if properly driven by the mathematical model the return on investment can be maximized in a manner that accounts for energy costs. Additionally or alternatively, the process can be later sped up, perhaps during a low demand time to account for any reduced production.

Moreover, the energy supply landscape is rapidly changing, with many new proposals likely to take effect in the near future and others, even those unknown today, will most likely arise. Accordingly, by employing features or aspects described herein, businesses can be better positioned to adapt, make necessary transitions, or even excel in this unpredictable environment. For example, one approaching change will be the emergence of the so called "smart grid." The smart grid is an enhancement to the utility electrical distribution process that allows rapid two-way communication between utilities and between utilities and consumers. The intention of the smart grid is to increase efficiency, increase reliability, reduce the energy consumed to produce the electricity, and reduce the associated emissions. Part of this process will be Automated Demand Response. Automated Demand Response will require users of the supplied energy to react to the available supply in real time. The facility may be instructed by the smart grid that it will need to reduce consumption to a certain level or by a specific percentage. Sufficient advance notice is intended to be provided to allow the facility to make appropriate adjustments, and the users will be charged a lower rate as an incentive, yet even if that is the case; it presents a number of challenges to users. Optimization component 402 can employ the above scenario as another input in determining update 406. The modulation concept can be applied here as well to implement the required level of production while still ensuring the best economic return. The concept of modulating the production process also keeps workers active or industrious, even if at a reduced rate, instead of idling them when equipment is shut down.

Moreover, in addition to the many aspects associated with update 406, it should be appreciated that new approaches or features can be provided in connection with process statement 122 such as, e.g., providing and/or combining process statement 122 with electronic batch records. Previously, electronic batch records have been employed to track recipes that include materials, sources, necessary or utilized equipment or facilities and so forth. Based upon the aspects described herein, electronic batch records can now be combined with energy consumption data 104, and particularly with that which has been characterized herein as sustainability factors 412 to track, say, carbon footprint in connection with supply chain management. As another example, by combining energy consumption data 104, particularly emission factors 410 and/or energy consumption data 104 associated with WAGES 114 can be provided to optimization component 402 (or analysis component 116 or a modeling component) in order to efficiently or intelligently prioritize or optimize scheduling or production.

Furthermore, in addition to potential improvements to internal production decisions energy consumption data 104, and particularly emission factors 410 and sustainability factors 412, can be associated with finished products to change external influences, such as those from consumers or regulatory agencies. For example, by tracking, measuring, or maintaining various sustainability factors 412 as detailed herein, interfaces or search-based products or applications can enable users to query based upon these sustainability factors 412. For instance, results can be immediately returned from the following (or similar) query: "find me a pair of shoes between X price range, having an emission factor below Y, and that includes no components that were sourced from a country that allows child labor."

Figure 5:
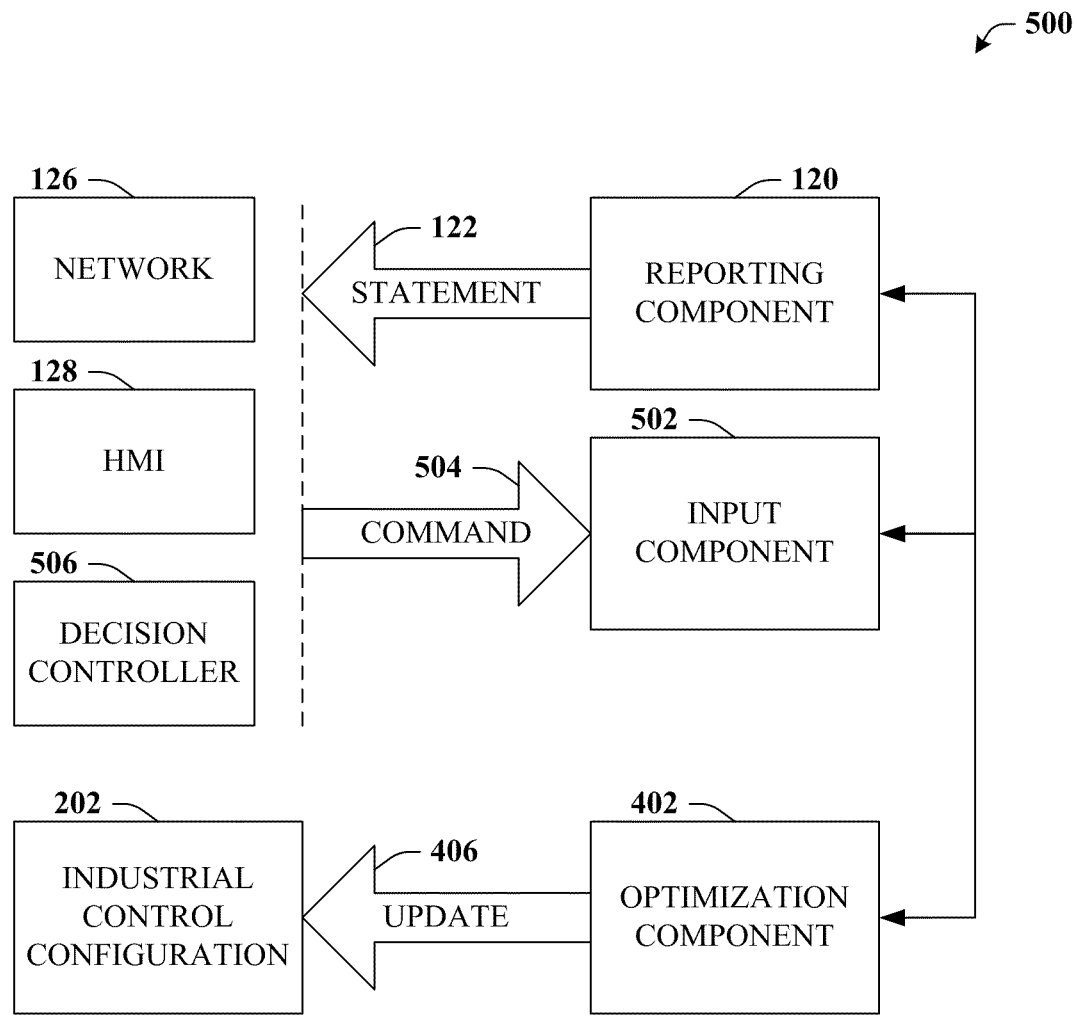
FIG. 5 depicts a block diagram of a system that can employ commands in connection with updating industrial control configuration.

Turning now to FIG. 5, system 500 that can employ commands in connection with updating industrial control configuration is provided. In particular, as described supra, various relevant information relating to, inter alia, energy consumption associated with automation process 106 can be provided to various participants in automation process 106. Such relevant information can be provided by reporting component 120 as detailed above by way of process statement 122, which can be delivered to HMI 128 or a display thereof associated with, say, a plant manager or other suitable personnel, or to decision controller 506. Regardless of the actual implementation details, system 500 can further include input component 502 that can obtain command 504 from any of network 126, HMI 128, decision controller 506, or from another source. Command 504 can pertain to update 406 to automation process 106 and/or to operational parameters associated with industrial control configuration 202 as discussed supra, and can be a function of energy consumption data 104, emission factor 410, or sustainability factor 412. In other words, update 406 provided by optimization component 402 can be based upon instructions or recommendations from other sources.

In addition, system 500 also serves to demonstrate various other applications for process statement 122. For example, HMI 128, with a display device either embedded in a device or machinery of industrial control configuration 202 or located remotely, can be employed for various informational purposes such as presenting real-time energy consumption data 104 or providing search or filtering functionality, or even forecasting features, potentially based upon specified criteria. Features associated with forecasting as well as automated changes to automation process 106 (e.g., update 406) can potentially invoke decision processor 506 as noted supra.

In addition to other features described herein, decision processor 506 can provide for or aid in various inferences or determinations. Such inferences can potentially be based upon, e.g., Bayesian probabilities or confidence measures or based upon machine learning techniques related to historical analysis, feedback, and/or previous other determinations or inferences. In accordance therewith, decision processor 506 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
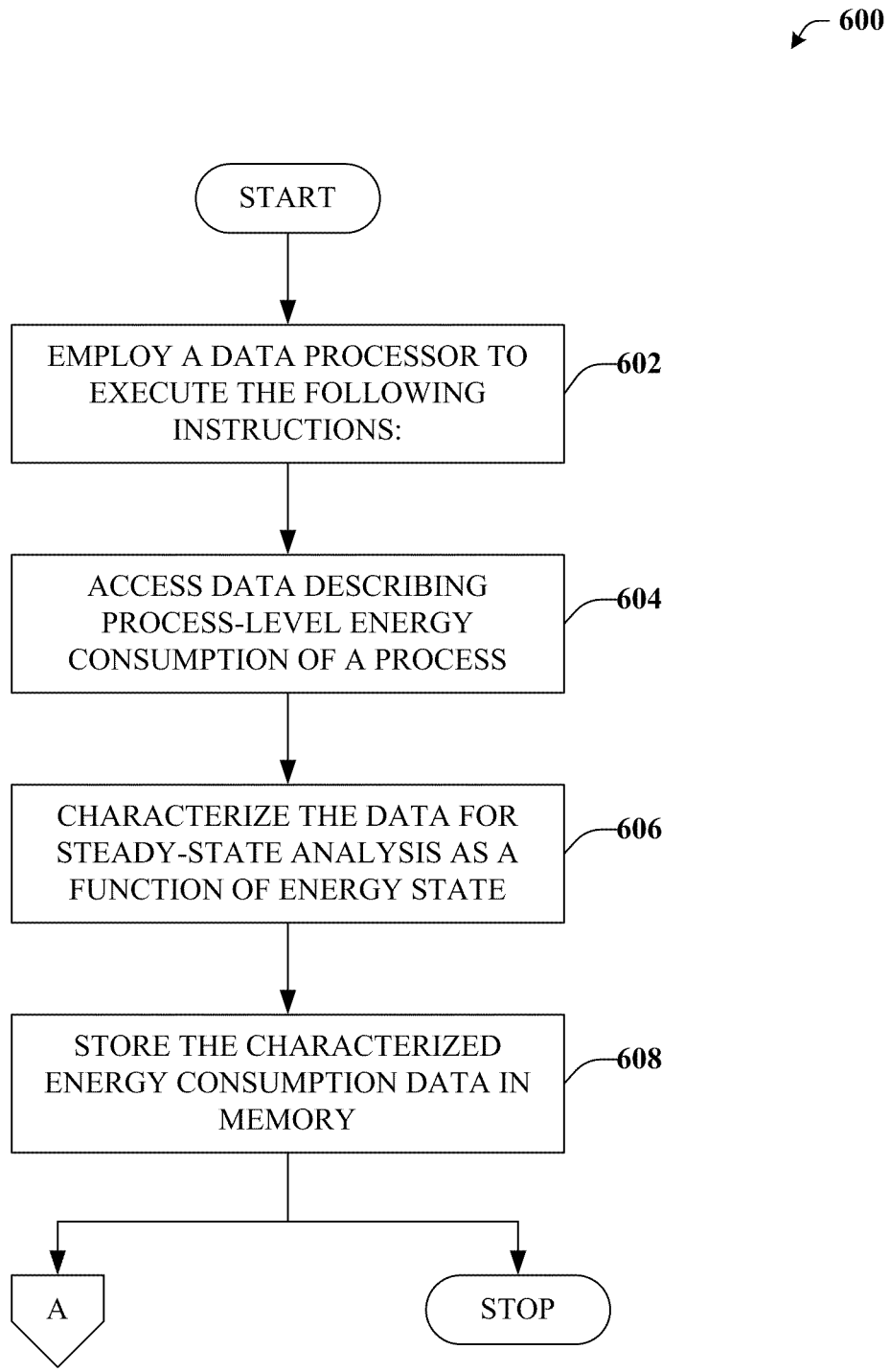
FIG. 6 illustrates an exemplary flow chart of procedures that define a method for facilitating energy consumption reporting and processing.
Figure 7:
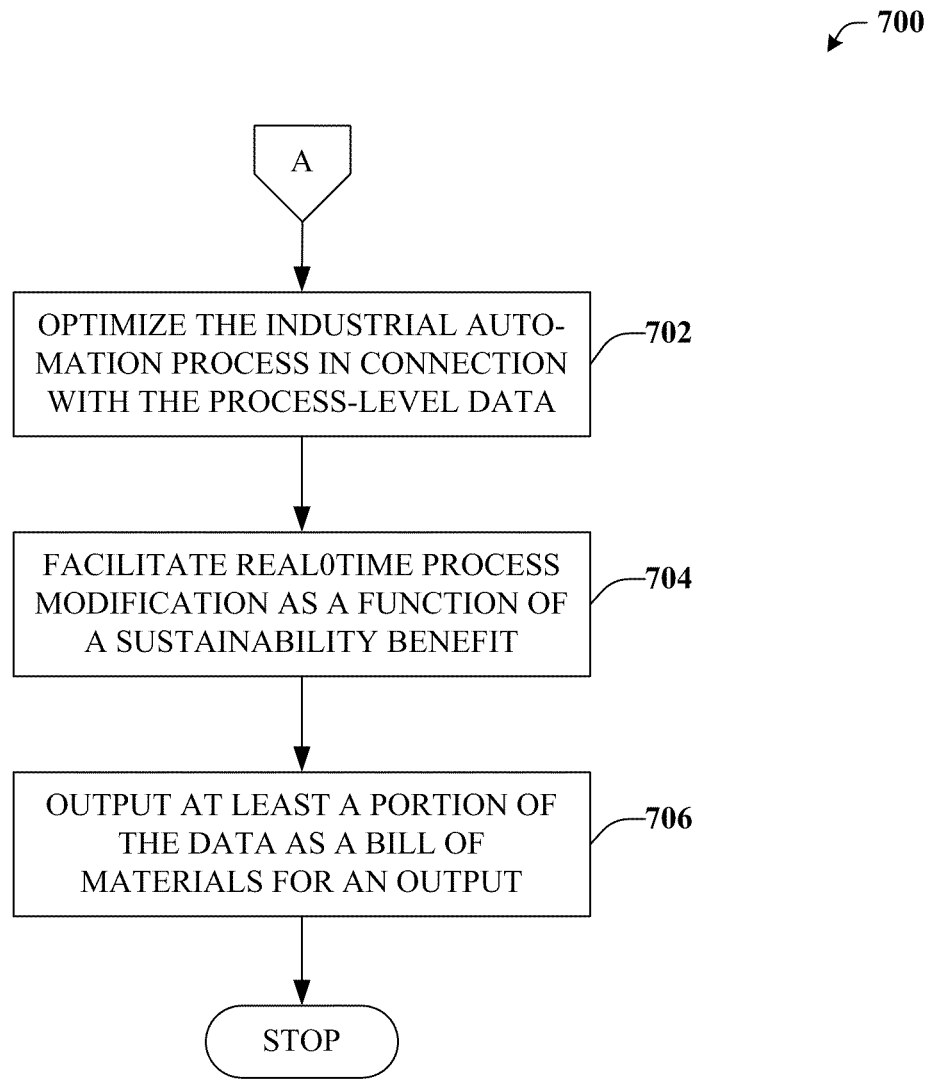
FIG. 7 depicts an exemplary flow chart of procedures defining a method for providing addition features in connection with facilitating energy consumption reporting, analysis, or processing.

FIGS. 6 and 7 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 6, exemplary computer implemented method 600 for facilitating energy consumption, water consumption, or other sustainability factor utilization reporting and processing is provided. Generally, at reference numeral 602, a data processor can be employed for executing the following instructions stored on a computer readable medium and described by reference numerals 604-608. Namely, at reference numeral 604, a first stored instruction relate to accessing data describing process-level energy or water consumption data of an industrial automation process. In particular, energy consumption data relating to one or more devices or components collected while the industrial automation process is in execution on those components can be accessed.

Next to be described, at reference numeral 606, the instruction can relate to characterizing the process-level energy consumption data for steady-state analysis of components of the industrial automation process as a function of energy consumption state. In more detail, the process-level energy consumption data can be characterized based upon the value of the data, based on the type of the data, based upon a comparison with other data or the like. Furthermore, the instruction can relate to storing the characterized process-level energy consumption data in memory as described by reference numeral 608. Accordingly, this stored information can be immediately available for other applications and can be maintained for later access or recall.

Referring to FIG. 7, method 700 for providing addition features in connection with facilitating energy consumption, water consumption, or other sustainability factor utilization reporting, analysis, or processing is illustrated. At reference numeral 702, the instruction can relate to optimizing the industrial automation process in connection with the process-level energy consumption data. For example, the automation process can be dynamically altered or adjusted based upon a current measure of the process-level energy consumption data, typically to incur increased efficiency or to reduce an energy utilization level. In addition, the automation process can be dynamically altered based upon one or more environmental factors.

Furthermore, at reference numeral 704, the instruction can relate to facilitating real-time process modification to a subset of the industrial automation process or chiller operation as a function of a sustainability benefit associated with the industrial automation process. In particular, the process modification can pivot on various emission data or sustainability factors to, e.g., improve the selected factor while, potentially, concurrently doing so in a manner that has minimal impact on other components or aspects of the industrial automation process. In another aspect, at reference numeral 706, the instruction can relate to outputting at least a portion of the process-level energy consumption data to a bill of materials report for an output of the industrial automation process. Accordingly, the bill of materials can include a columns or descriptions itemizing energy consumption, energy costs, emissions, as well as other relevant sustainability factors.

Figure 8:
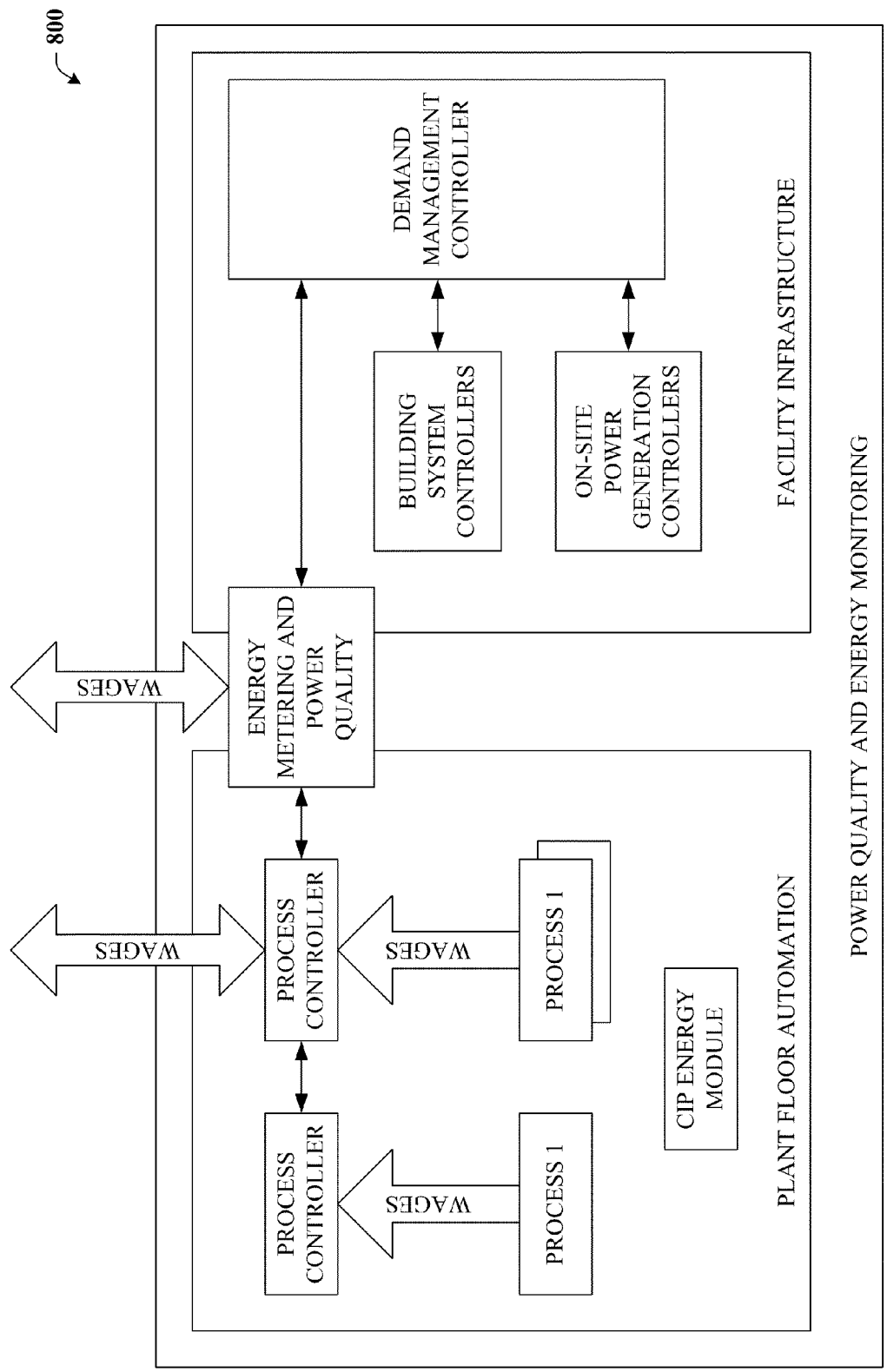
FIG. 8 illustrates a block diagram schematic of an example power quality and energy monitoring architecture in connection with a plant or facility.

Turning now to FIG. 8, illustration 800 presents a block diagram schematic of an example power quality and energy monitoring architecture in connection with a plant or facility. As depicted, energy metering and power quality can span plant floor automation and facility infrastructure (e.g., data centers, heating, ventilation, and air conditioning (HVAC), lighting . . . ) and can monitor various components included therein. In particular, WAGES metering, smart metering, harmonics, power factor, sags/swells, and/or transients can be monitored. It should be appreciated that building system controllers within the facility infrastructure can include or relate to QBMS, chiller Op and so on. Likewise On-site Power generation controllers included in the facility infrastructure included both traditional forms of energy as well as alternative forms of energy. Furthermore, all metering or monitoring as well as all or a portion of communication or interaction between the depicted components can conform to Generic Model For Communications And Control Of Manufacturing Equipment Standard (GEMS).

Figure 9:
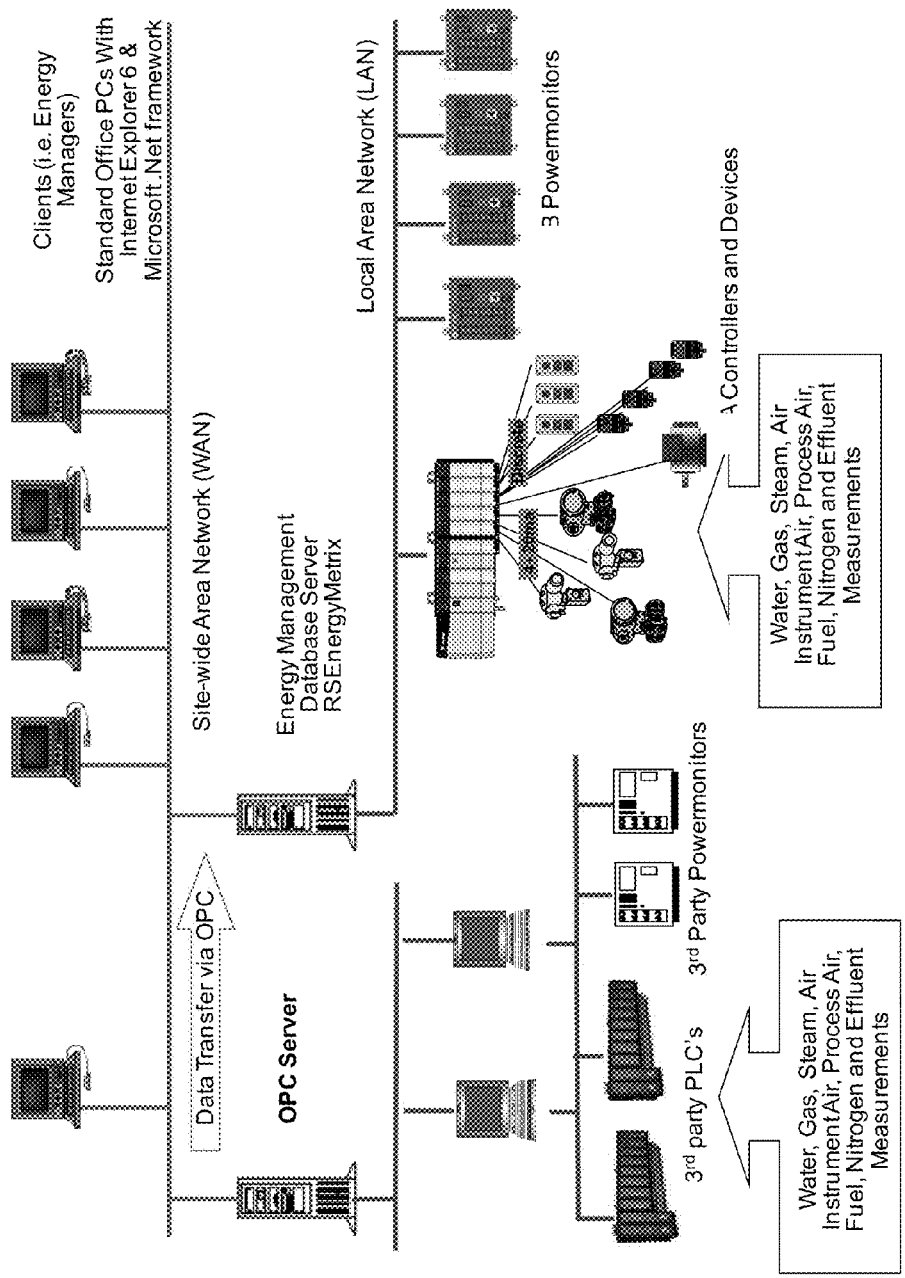
FIG. 9 is one example energy management architecture.

With reference now to FIG. 9, example energy management architecture 900 is depicted. Working from the bottom up, WAGES can be monitored by the third party programmable logic controllers (PLC) and/or various other controllers and devices, whereas strict energy consumption can be monitored by the third party power monitors. Such data can be fed to a LAN and received by the Object Linking and Embedding for Process Control (OPC) Server and/or the energy management database server. Admin or standard clients can be transmitted data by way of a WAN.

Figure 10:
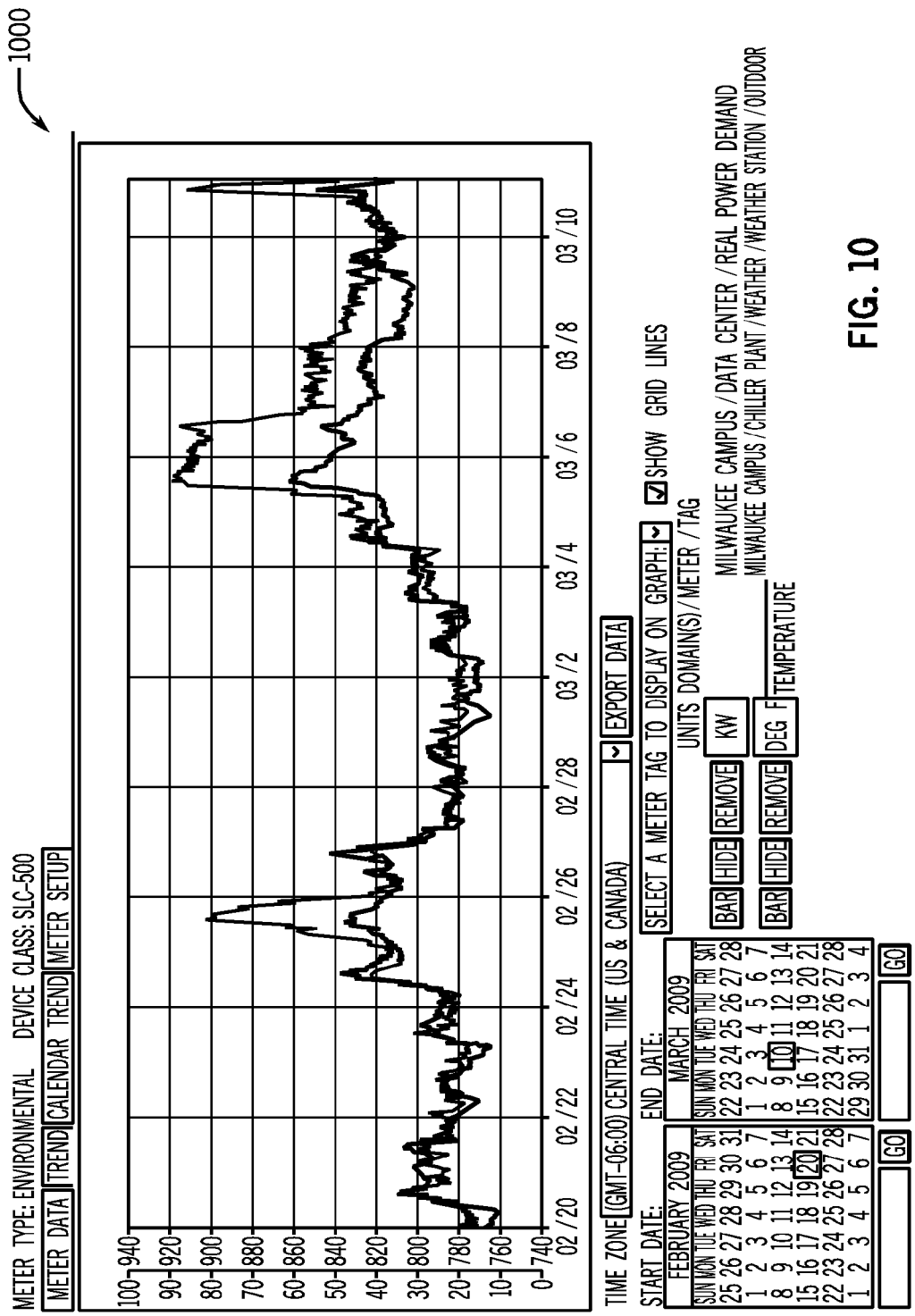
FIG. 10 depicts an example user-interface in connection with metered data and an environmental factor.

FIG. 10 presents an example user-interface 1000 in connection with metered data and an environmental factor. Specifically, the depicted graph relates to an example output associated with trending. It should be understood that data for populating the graph can be provided by way of process statement 122, while the depicted output can be displayed in connection with HMI 128, both of which are discussed at length supra. Such trending can be informational in nature as well as employed for, e.g., forecasting or optimization. In this case, trends associated with energy consumption data is plotted alongside ambient temperature measurements. Naturally, the above is intended to be merely exemplary in nature and numerous other parameters can be employed.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

Furthermore, in general, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A system, comprising:
a data processor coupled to memory retaining instructions carried out by the data processor, in operation, for:
an acquisition component that, in operation, obtains energy consumption data across a plurality of locations during execution of one or more automation sub-processes of an automation process configured to produce a specified product or service;
an analysis component that, in operation, generates processed data based on the energy consumption data, wherein the processed data characterizes the energy consumption data as a function of at least one operational parameter of the one or more automation sub-processes, wherein the at least one operational parameter comprises a process scheduling parameter comprising a plurality of timetables of engagement for a plurality of machines executing the one or more automation sub-processes, wherein each of the plurality of timetables of engagement is associated with a different amount of energy consumed by the one or more automation sub-processes; and
a machine control component that, in operation, controls the plurality of machines executing the one or more automation sub-processes of the automation sub-process according to one of the plurality of timetables of engagement, wherein the one of the plurality of timetables of engagement is selected based on the processed data characterized as a function of the at least one operational parameter and the different amount of energy consumed by the one or more automation sub-processes.

2. The system of claim 1, wherein the automation process comprises a discrete process or a batch process.

3. The system of claim 1, wherein the at least one operational parameter comprises at least one of a run-time parameter that relates to configuration of at least one of the plurality of machines machine employed during the at least one of the one or more automation sub-processes, a production modulation parameter that relates to modification of the at least one of the one or more automation sub-processes or a predetermined schedule thereof, or any combination thereof.

4. The system of claim 1, wherein the machine control component, in operation, employs the at least one operational parameter and a process control algorithm to determine an update to the one or more automation sub-processes based upon a state of the energy consumption data, the processed data, or any combination thereof.

5. The system of claim 4, wherein the machine control component determines the update based upon at least one environmental factor.

6. The system of claim 4, wherein the machine control component determines the update based upon at least one emission factor in connection with the automation process.

7. The system of claim 4, wherein the machine control component determines the update to the one or more automation sub-processes based upon a sustainability factor in connection with the automation process.

8. The system of claim 7, wherein the sustainability factor pertains to at least one of an energy provider, raw materials, waste, effluent, worker safety, corporate policy, fair labor policy, or regulatory mandates.

9. The system of claim 1, wherein the at least one operational parameter is configured to adjust at least one operation of the at least one of the one or more automation sub-processes, wherein the at least one adjusted operation affects the amount of energy consumed by the one or more automation sub-processes.

10. The system of claim 1, comprising a reporting component that, in operation, generates a bill of materials that itemizes the one or more automation sub-processes used to produce the specified product or service, and a respective portion of the energy consumption data, a respective portion of the processed data, or any combination thereof directly associated with a respective automation sub-process.

11. The system of claim 10, wherein the reporting component formats and outputs the bill of materials by way of email, electronic message, printer, or a human-machine interface (HMI).

12. The system of claim 11, wherein the bill of materials is transmitted to at least one of an authorized network address, a graphical display associated with the HMI, a data store, or a decision tree of an industrial control configuration.

13. A method, comprising:
employing a data processor for executing the following instructions stored on a computer readable medium:
receiving energy consumption data associated with one or more components of one or more industrial automation sub-processes of an industrial automation process during execution of the one or more industrial automation sub-processes;
characterizing the energy consumption data as a function of at least one operational parameter of at least one of the one or more industrial automation sub-processes, wherein the at least one operational parameter comprises a process scheduling parameter comprising a plurality of timetables of engagement for the one or more components, wherein each of the plurality of timetables of engagement is associated with a different amount of energy consumed by the one or more components of the at least one of the one or more industrial automation sub-processes;
storing the characterized energy consumption data in memory; and
controlling the one or more components according to one of the plurality of timetables of engagement by selecting the one of the plurality of timetables of engagement based on the processed data characterized as a function of the at least one operational parameter and the different amount of energy consumed by the one or more components of the one or more industrial automation sub-processes.

14. The method of claim 13, further comprising outputting, during execution of the at least one of the one or more industrial automation sub-processes, a bill of materials report that itemizes the at least one of the one or more industrial automation sub-processes and component parts, raw materials, and a respective portion of the characterized energy consumption data that correspond to the at least one of the one or more industrial automation sub-processes.

15. The method of claim 13, further comprising facilitating real-time process modification to the at least one of the one or more industrial automation sub-processes as a function of a sustainability benefit associated with the industrial automation process.

16. A non-transitory, computer-readable medium comprising computer executable code comprising instructions configured to:
   acquire device-level energy consumption data, water consumption data, or any combination thereof for a set of devices associated with one or more industrial automation sub-processes of an industrial automation process during execution of the industrial automation process;
   analyze, during execution of the industrial automation process, the device-level energy consumption data, the water consumption data, or any combination thereof as a function of at least one operational parameter of the one or more industrial automation sub-processes, wherein the at least one operational parameter comprises a process scheduling parameter comprising a plurality of timetables of engagement for the set of devices, wherein each of the plurality of timetables of engagements is associated with a different amount of energy or water consumed by at least a portion of the one or more industrial automation sub-processes;
   control the set of devices according to one of the plurality of timetables of engagement by selecting the one of the plurality of timetables of engagement based on the analyzed energy consumption data, the water consumption data, or any combination thereof and the different amount of energy or water consumed by the at least a portion of the one or more industrial automation sub-processes; and
   report, during execution of the industrial automation process, a relevant portion of the analyzed device-level water consumption data to a recipient, wherein the relevant portion of the analyzed device-level water consumption data is reported as a bill of materials that itemizes the at least a portion of the one or more industrial automation sub-processes and respective component parts, respective raw materials, and a respective portion of the analyzed device-level water consumption data that correspond to the at least a portion of the industrial automation sub-processes.

17. The non-transitory, computer-readable medium of claim 16, comprising instructions configured to modulate the at least a portion of the one or more industrial automation sub-processes or a disparate automation process for facilitating a desired change in the device-level energy consumption, the water consumption, or any combination thereof.

18. The non-transitory, computer-readable medium of claim 17, comprising instructions configured to receive an input describing the desired change or the modulating of the at least a portion of the one or more industrial automation sub-processes.

19. The system of claim 16, wherein the at least one operational parameter is configured to adjust at least one operation of the at least a portion of the one or more industrial automation sub-processes, wherein the at least one adjusted operation affects an amount of energy consumed by the at least a portion of the one or more industrial automation sub-processes.

20. The system of claim 16, wherein the at least one operational parameter comprises at least one of a run-time parameter that relates to configuration of a machine employed during the one or more automation sub-processes, a production modulation parameter that relates to modification of the one or more automation sub-processes or a predetermined schedule thereof, or any combination thereof.

* * * * *